United States Patent [19]

Terashita

[11] 4,416,539
[45] Nov. 22, 1983

[54] METHOD OF LOCATING ABNORMAL ORIGINALS

[75] Inventor: Takaaki Terashita, Kanagawa, Japan

[73] Assignee: Fuji Photo Film Co., Ltd., Kanagawa, Japan

[21] Appl. No.: 389,353

[22] Filed: Jun. 17, 1982

[30] Foreign Application Priority Data

Jun. 22, 1981 [JP] Japan .................................. 56-96290

[51] Int. Cl.³ ............................................ G03B 27/72
[52] U.S. Cl. ........................................ 355/77; 355/38
[58] Field of Search ............................. 355/38, 68, 77

[56] References Cited

U.S. PATENT DOCUMENTS 4,152,068  5/1979  Bickl et al. ........................ 355/77 X
4,346,402  8/1982  Pugsley ............................. 355/77 X

*Primary Examiner*—Michael L. Gellner
*Attorney, Agent, or Firm*—Sughrue, Mion, Zinn, Macpeak and Seas

[57] ABSTRACT

A method for locating an abnormal original in a photographic print exposure control process is disclosed. In the method, a number of portions of the original are subjected to photometry, and an average of each of a number of characteristic values are determined from the measured values is calculated for frames which are considered to be included in a series of originals, and a plurality of these averages are used to distinguish the abnormal original from the normal original.

6 Claims, 4 Drawing Figures

METHOD OF LOCATING ABNORMAL ORIGINALS

BACKGROUND OF THE INVENTION

The present invention relates to a method of locating abnormal originals which should be distinguished from normal originals in the process of photographic print exposure control. The term "abnormal originals" as used herein means those originals that have been deteriorated by the effects of high temperature, high humidity, gases and as a result of extended storage, as well as those which are produced by photography with unusual light sources such as fluorescent lamps, tungsten lamps and setting sun light. The term "originals" means original negatives for negative-positive photography and original positives for positive-positive photography, but for convenience the following description is made with reference to negative-positive photography.

DESCRIPTION OF THE PRIOR ART

Two typical methods are known for photographic print exposure control. In one method, the transmission densities of yellow, magenta and cyan images on a negative are measured, and the exposure times for each of the blue, green and red lights used for printing control is determined, and the original negative is exposed for the so determined exposure times through respective blue, green and red light exposure filters. This method is called the "high correction method" in the art. This method provides a print having almost the same balance in the yellow, magenta and cyan densities irrespective of the transmission densities of the yellow, magenta and cyan images on the original negative. Accordingly, if a negative having color failure (e.g., a picture of a person on a red carpet) is processed by the high correction method, print having a very poor color balance is produced, but a print having good color balance is produced from an abnormal negative (e.g., deteriorated negatives or those obtained by photography with unusual light sources) or in spite of differences in photosensitive materials (e.g., photosensitive materials of different types or different manufacturers).

In the other typical control method, the negative is exposed to white light in the first stage of exposure, and when exposure to that light having the shortest exposure time of blue, green and red is completed, a filter of the complementary color to cut that light is inserted in the exposure system to thereby avoid further exposure to that light, and the remaining two colors are sequentially cut in the same manner until the predetermined exposure is completed. The filters used in this method have yellow, magenta and cyan colors which cut blue, green and red light, respectively, but their spectral characteristics are far from being ideal and they are unable to precisely cut only the specific light but also cut the light of other colors to some extent. Therefore, this method is not as effective as the high correction method in correcting negatives of poor color balance, and hence is called the lowered correction method. Accordingly, this method produces a print having fairly good color balance from a negative with color failure but not from an abnormal negative or with different photosensitive materials.

As will be understood from the above, if the high correction method is used in photographic print exposure control, an adjustment must be made to suppress its corrective capability for negatives with color failure, and if the lowered correction method is used, a reverse adjustment is necessary for abnormal negatives or different photosensitive materials.

A method capable of freely controlling the degree of correction is described in Japanese Patent Application (OPI) No. 154633/17 (the term "OPI" as used herein refers to a published unexamined Japanese patent application). This method measures the transmission densities of three colors on the negative, and generates print exposure control signals, and achieves the desired control of the degree of correction by simply changing the factors indicative of the necessary degree of correction in a formula indicative of the density signals for the three colors.

Whichever of the two typical exposure control methods is used, it is very important to distinguish a negative with color failure from an abnormal negative. The conventional color printer is so designed such that after distinguishing a negative with color failure from an abnormal negative by human eyes, correction of the exposure conditions is made by manually operating color correction keys or keys for controlling the exposure times for blue, green and red light. This machine produces prints which are not completely satisfactory but which are commercially acceptable. Moreover, 10 to 20% of the negatives obtained are usually abnormal, and the frequency of abnormal negatives may be as high as 30% or more in hot and humid areas, and visually locating abnormal negatives requires skill, except for those which are obtained by taking pictures with unusual light sources.

With the recent development of automatic color printers, many methods have been proposed for determining the required print exposure by using various characteristic values obtained through calculation of the photometric values obtained by scanning a negative image at tiny spots (see, for example, Japanese Patent Application (OPI) No. 471/72, Japanese Patent Publication No. 3686/74 and Japanese Patent Application (OPI) No. 23936/77). But none of these methods has completely solved the important problem of the distinction between negatives with color failure and abnormal negatives.

Negatives with color failure and abnormal negatives are common in that they have a balance in the large area transmittance densities (hereunder referred to as LATD) of blue, green and red colors which differs from the balance of the LATD values of the three colors on an average negative. It is therefore fairly easy to distinguish the two negatives from an average negative, as effected in the method described in Japanese Patent Application (OPI) No. 130443/75. But to distinguish a negative with color failure from an abnormal negative, it must be determined whether the difference between the balance in the LATD values of the three colors on each negative and the balance in the LATD values of the three colors on the average negative is due to the type of object, or to a deteriorated negative, or the use of unusual light. To determine which cause is the right one in a given instance has been very difficult without depending upon human vision.

A method for distinguishing a negative with color failure from an abnormal negative using the fact that abnormal negatives occur in a number of consecutive frames is described in Japanese Patent Publication No. 31450/80. To distinguish between color failure and unusual light, this method performs a simple arithmetic operation on the measured LATD values of the blue, green and red light, and if the two factors cannot be distinguished from each other, the questionable frame is compared with several frames before and after that frame. Accordingly, this method is capable of distinguishing negatives with color failure from abnormal negatives with higher accuracy than other conventional methods, but the accuracy is still not high enough since the LATD value is the only characteristic value used as basic data for distinguishing the color failure negative from the abnormal negative.

SUMMARY OF THE INVENTION

Therefore, one object of the present invention is to provide a method for locating abnormal originals which is capable of distinguishing a negative with color failure from an abnormal negative with higher accuracy than has been achieved by the conventional technique which uses the LATD value to distinguish the two negatives.

This object can be achieved by a method of locating an abnormal original in photographic print exposure control, wherein a number of portions of the original are subjected to photometry, and an average of each of a number of characteristic values are determined from the measured values is calculated for frames that are considered to be included in a series of originals, and a plurality of these averages are used to distinguish the abnormal original from the normal original.

DETAILED DESCRIPTION OF THE PREFERRED EMBODIMENTS

Negatives usually deteriorate if they are exposed to a hot and humid atmosphere, if they remain undeveloped for an extended period after picture-taking, or if they are exposed to undesired gaseous atmospheres such as formaldehyde gas. Deteriorated negatives also occur if overdue (expired) photosensitive material (film) is used. If negatives are exposed to formaldehyde gas, not only does excessive fog occur but the dyes are also broken down or an impure dye is formed.

In deteriorated negatives, at least one of the blue-, green-, and red-sensitive layers is defective with respect to fog, sensitivity or gradation, and such deteriorated negatives do nor occur in only some parts of the film but more often, they affect an entire roll of film. Abnormal negatives which are due to unusual light sources typically occur when pictures are taken with a fluorescent or tungsten lamp. In the former case, a significant deficiency of blue and red light is the cause, and in the latter case, a significant deficiency of blue light is the cause. Like deteriorated negatives, negatives made abnormal due to unusual light often affect an entire roll of film which has been subjected to picture taking with the same source of unusual light.

These deteriorated or abnormal negatives can be detected by comparing their LATD values with those of normal negatives, but as mentioned before, this method involves much difficulty in distinguishing such abnormal negatives from negatives with color failure. The maximum density (hereunder DMX) of a negative is in most cases given by objects of a neutral color such as clouds, white walls and white colors, but in abnormal negatives, the DMX is given by colors other than a neutral color. This is because of a change in the sensitivity, fog and gradation characteristics of the negative. The present inventors have found that all abnormal negatives are characterized by a significant difference from the normal negative with respect to the balance between the maximum densities of blue, green and red colors (hereunder referred to as DMX(B), DMX(G) and DMX(R), respectively). As already mentioned, negatives with color failure are similar to abnormal negatives in that their balance of the LATD values of blue, green and red colors differs greatly from the balance of the normal negative. However, the balance of the DMX values of the three colors in the negative with color failure is very similar to the balance of the DMX values for the normal negative, and so this fact can be used to distinguish the abnormal negative from the color failure negative. More specifically, an abnormal negative can be detected with high accuracy by checking a roll of negative film for the average values of DMX(B), DMX(G) and DMX(R).

Figure 1:
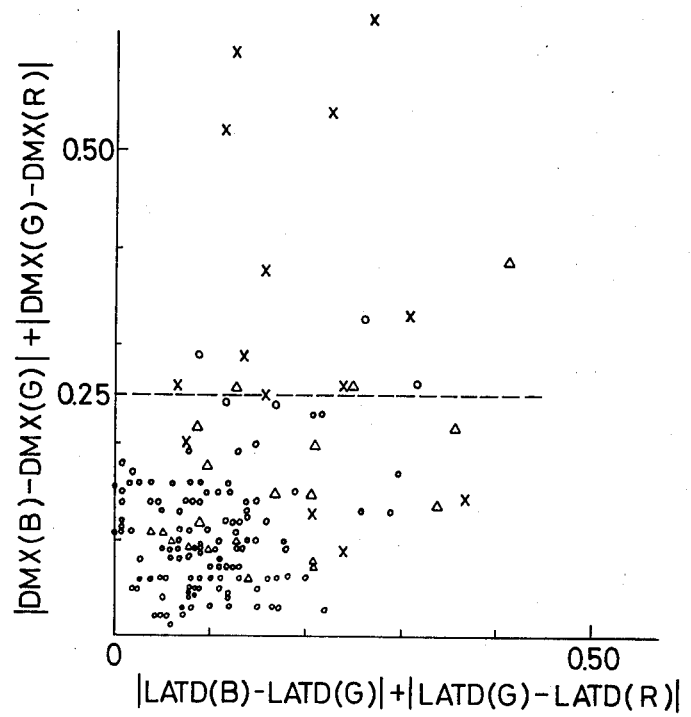
FIG. 1 is a graph comparing the ability of maximum density evaluation to locate an abnormal negative, with that of the LATD.

FIG. 1 is a graph comparing the ability of DMX evaluation to detect an abnormal negative, with that of LATD. In the figure, the y-axis represents the value of $$|DMX(B)-DMX(G)| + |DMX(G)-DMX(R)|$$
(hereunder DMXBGR)

and the x-axis represents the value of $$|LATD(B)-LATD(G)| + |LATD(G)-LATD(B)| \text{ hereunder LATDBGR}).$$

The respective points in the figure plot the values of $\overline{DMXBGR}$ and $\overline{LATDBGR}$ as calculated from the average values of DMX and LATD for one roll of negative film, and represent the deviation of these values from the DMX and LATD values of a neutral color. The crosses, triangles and black dots indicate abnormal negatives, negatives with slightly poor color tone, and normal negatives, respectively. In the experiment conducted to obtain the data of FIG. 1, 182 rolls of negative samples were used, and 10 out of the 14 abnormal rolls could be detected by regarding samples having a $\overline{DMXBGR}$ value of 0.25 or more as abnormal samples, and only 3 normal samples were mistaken for abnormal ones. FIG. 1 also shows that abnormal samples (x) were distinctly separated from normal samples along the y-axis whereas they were not satisfactorily separated along the x-axis, demonstrating that DMX is far more effective than LATD in distinguishing abnormal negatives from normal negatives.

The data of FIG. 1 was obtained using $\overline{DMXBGR}$ as an index for the deviation of DMX values from those of a neutral color. An equally good result is obtained by using other indices, for example, $\{(DMX(B)-DMX(B))^2+(DMX(G)-DMX(R))^2\}^{\frac{1}{2}}$.

Various indices can be generated by processing the various characteristic values of the negatives to compare the balance of the DMX values of blue, green and red colors in a normal negative with the balance for an abnormal negative. The method of the present invention is by no means limited to the particular embodiment described above, and various modifications thereof are possible so long as they reflect the basic concept of comparing the balance of the DMX values of the three colors as between normal and abnormal negatives. The number of DMX values to be measured for one negative image plane need not be one, and instead, one image plane may be divided into several small portions for calculation of the average of the DMX values for the respective portions.

Figure 2:
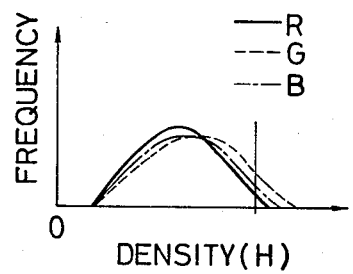
FIG. 2 is a histogram showing the red, green and blue densities of a single negative image plane.

FIG. 2 is a histogram of the densities of blue, green and red colors making up a single negative image plane. As shown, the DMX may be effectively replaced by the average of the densities above a certain high density point (H).

The DMX may be combined with other characteristic values to distinguish normal negatives from abnormal negatives, such as the contrast or the difference between maximum and minimum density (hereunder referred to as CNT), the area of a high-chroma color (hereunder CS) and the area of a neutral color (hereunder NS).

The various characteristic values were compared with one other for their ability to pick out abnormal negative film from 503 rolls of negative sample, and the results are shown in the following table. Thirty-three rolls out of the 503 samples were abnormal.

TABLE

| Characteristic values | The number of samples correctly identified as abnormal | The number of normal samples that were mistaken for abnormal samples |
| --- | --- | --- |
| (1) $\overline{DMXBGR}$ | 18 | 8 |
| (2) $\overline{DMXBGR}$ and $\overline{CS}$ | 18 | 5 |
| (3) $\overline{DMXBGR}$ and $\overline{NS}$ | 19 | 6 |
| (4) $\overline{DMXBAR}$ and $\overline{CNG(G)}$ | 20 | 6 |
| (5) $\overline{DMXBGR}$, $\overline{CS}$, $\overline{NS}$ and $\overline{CNT(G)}$ | 23 | 3 |

In the table, case (1) indicates that the index $\overline{DMXBGR}$ was used alone as a characteristic value for detecting abnormal negatives. Case (2) indicates that the index $\overline{DMXBGR}$ was combined with $\overline{CS}$, representing the average of the area of high-chroma color for one roll of negative film. Case (3) indicates that the index $\overline{DMXBGR}$ was combined with $\overline{NS}$, representing the average of the area of neutral color for one roll of negative film. These two additional indices were selected since the larger the $\overline{CS}$ value, the higher the possibility that the specific negative has color failure, and the smaller the $\overline{NS}$ value, the higher the possibility that the specific negative is abnormal.

Case (4) indicates that the index $\overline{DMXBGR}$ was combined with $\overline{CNG(G)}$, representing the average of the contrast for one roll of negative film, and this index was selected since abnormal negatives have low contrast. Case (5) indicates that the index $\overline{DMXBGR}$ was combined with $\overline{CS}$, $\overline{NS}$ and $\overline{CNT(G)}$. When three or more characteristic values are used, a linear formula combining these values can detect abnormal negatives with high accuracy. In case (5), the following formula was used as a decision formula, and the specific negative was identified as abnormal when X was greater than zero.

$$X = 3.65 + 0.20 \times \overline{DMXBGR} - 0.03 \times \overline{CS} - 0.003 \times \overline{NS} - 0.08 \times \overline{CNT(G)} \quad (1)$$

The above table shows that case (5) achieved the most accurate detection of abnormal negatives.

Other applicable characteristic values are DMX(W) (=(DMX B+DMX G+DMX R)/3), and CNT(W) (=(CNT(B)+CNT(G)+CNT(R))/3). Alternatively, the area of high-chroma color may be divided into $\overline{CS(B)}$, $\overline{CS(G)}$ and $\overline{CS(R)}$ for blue, green and red colors, respectively. The proportions of frames with color failure and those presumed to be abnormal negatives in one roll of negative film may also be used as a characteristic value. Minimum density and the number of density points that can be regarded as skin color may be used effectively. Combinations of these values, such as the maximum density of a neutral color area and the average density of colors included in a neutral color area are also effective.

The foregoing description relates to the use of the average of specific characteristic values for one roll of negative film. But in some cases, abnormal negatives may be detected more accurately by dividing a roll of negative film into two parts, because the first half of a roll of negative film with fading of the latest image often undergoes more time-dependent deterioration than the second half, and the first half of a fogged roll is thus affected more than the second half.

In another method, two adjacent frames may be compared with one another for the specific characteristic value, and if the difference is within a certain range, the two frames may be regarded as being included in a series of negatives, and if the difference is beyond the range, an abnormal negative can be detected by checking the characteristic values of the two frames against the average for the preceding frames which were regarded as being included in the series of negatives. This method is capable of distinguishing abnormal negatives in a certain roll from the other negatives which are normal, and hence, the undesired abnormal negatives can be detected with even higher accuracy, and prints with good color balance can be produced.

As described in the foregoing, various characteristic values can be used as indices to detect abnormal negatives by determining whether the average of the specific values for a series of originals is greater or smaller than a predetermined value, or by using an abnormal negative detecting formula which is generally represented as follows:

$$X = C_0 + C_1 \overline{Y}_1 + C_2 \overline{Y}_2 + \ldots + C_n \overline{Y}_n \quad (2)$$

wherein:

$C_0, C_1, \ldots C_n$: coefficients;

$\overline{Y}_1, \overline{Y}_2, \ldots \overline{Y}_n$: the average, for the frames deemed to be included in a series of negatives, of $Y_1, Y_2, \ldots Y_n$, which are the characteristic values determined by photometric measurement of a number of locations on each negative.

The coefficients $C_0, C_1, \ldots C_n$ can be determined by analyzing a number of negatives by a statistical technique. By the formula (2), the value X for a series of negatives is determined, and if it is greater or smaller than a certain value, that series of negatives is regarded as abnormal. Since the value X calculated by the formula (2) approximates the degree of abnormality of the abnormal negatives, this value can be used to control the necessary degree of correction of the photographic print exposure. When determining the print exposure necessary for a specific frame, the result of the determination as to whether a series of negatives includes that frame may be corrected by information on that frame (e.g., the value X as calculated for that frame by formula (2) or the area of high-chroma color). Formula (2) can also be used to calculate the value X for individual frames to determine whether those frames are abnormal negatives. Furthermore, the values of X of the individual frames may be averaged for the frames that are regarded as being included in a series of negatives, and the average so obtained may then be used to check whether the individual frames are abnormal.

As described hereinabove, the method of the present invention is capable of easy and accurate discrimination between abnormal and normal originals.

The method of the present invention is hereunder described in greater detail with reference to an embodiment wherein it is incorporated in an exposure determining apparatus for a photographic printer.

Figure 3:
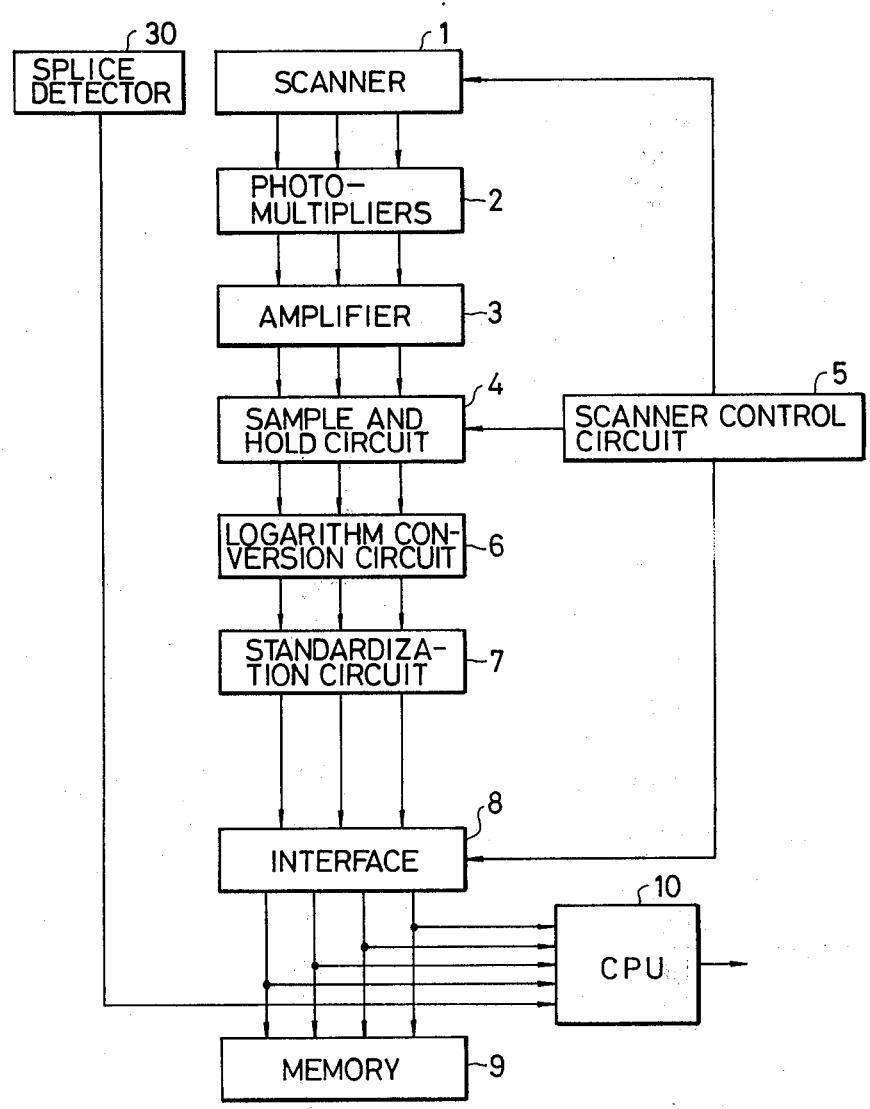
FIG. 3 is a block diagram of an exposure determining system.

FIG. 3 is a block diagram showing the essential parts of one example of the exposure determining apparatus. A scanner 1 scans the image plane of a color photographic film, and light that has been transmitted through the film (or which may have been reflected therefrom) is separated by a color-separating optical element into blue, green and red light. The three light components enter photoreceptors for the respective colors, say, photomultipliers 2, where they are subjected to photometry.

The photometric signals from the photomultipliers 2 enter an amplifier 3 where they are amplified for the respective colors, and then are fed to a sample-hold circuit 4 where they are sample-held. The sample-hold circuit 4 is controlled by a sampling pulse from a scanner control circuit 5. The scanner control circuit controls the scanning mechanism of the scanner 1, so the sample-hold circuit 4 is operated in synchronism with the scanner 1. In consequence of the above procedures, a regular pattern of photometric points is formed on the image plane of the color photographic film. For example, if the film is a 35 mm film, the area (22×34 mm) without the outer edge may be scanned by dots having a diameter of 1 mm (increased to about 3 mm on the color print) and being spaced 1 mm apart. This means that the image plane is subjected to photometry at 748 (22×34) points. The photometric signals for blue, green and red colors of the individual points sampled by the sample and hold circuit 4 are sent to a logarithm conversion circuit 6 whereby they are converted to logarithmic values to calculate the blue density B, green density G and red density R. More specifically, the value log 1/T is calculated, T being the transmittance of the light of a specific color.

Signals indicative of the blue density B, green density G and red density R are supplied to a standardization circuit 7 where they are corrected for gamma and sensitivity depending upon the type of film being processed. The gamma and sensitivity values that represent the exposure vs. density profile vary with the film manufacturer and the type of film. Therefore, different densities are obtained even if a picture of the same object is taken under the same conditions. To avoid this, keys for various types of film are operated so that the density signals are corrected by the addition of predetermined constants through an adder, and thereafter, the gain of the amplifier is multiplied by a certain factor to provide gamma correction. By this procedure, the same density will be obtained from the same object. Subsequently, the signals for blue density B, green density G and red density R of each photometric point are fed to an interface 8, and then to a memory 9 where they are stored at addresses specified by photometric point signals from the scanner control circuit 5. After the entire surface of the negative film has been scanned, data is read out from the memory 9 to a CPU (central processing unit) 10.

The specific characteristic values for calculation of the exposure are calculated, and the thus calculated values are used to determine the necessary print exposure by way of an arithmetic operation formula of the type described in, say, Japanese Patent Application (OPI) No. 28131/79. At the same time, characteristic values for the detection of abnormal negatives are calculated, and are compared with the values of the preceding frames to see if the specific frame is included within a series of negatives, and if the answer is yes, the characteristic values of that frame are added to those of the preceding frames. The characteristic values obtained by adding the data for the last of a series of negatives to that for all the preceding frames are averaged and substituted into formula (2) to check whether all the negatives in the particular series of negatives are abnormal. Both the result of checking as to whether a certain frame is included within a series of negatives and the result of the arithmetic operation using formula (2) are stored in the memory 9 at specified addresses.

When the measurement of one film roll is completed by a signal from a splice detection circuit, the result of checking as to whether a certain frame is included in a series of negatives and the result of arithmetic operation using formula (2) are read out from the memory to the CPU, and the result of the arithmetic operation using formula (2) is converted into information on the degree of correction of the print exposure, so that all the negatives that have been determined to be included in a series of negatives are corrected by the same degree.

If the exposure determining apparatus described above is not on-line with a color printer, information on the necessary exposure is recorded on punched or magnetic tape and is used to control the color printer.

Figure 4:
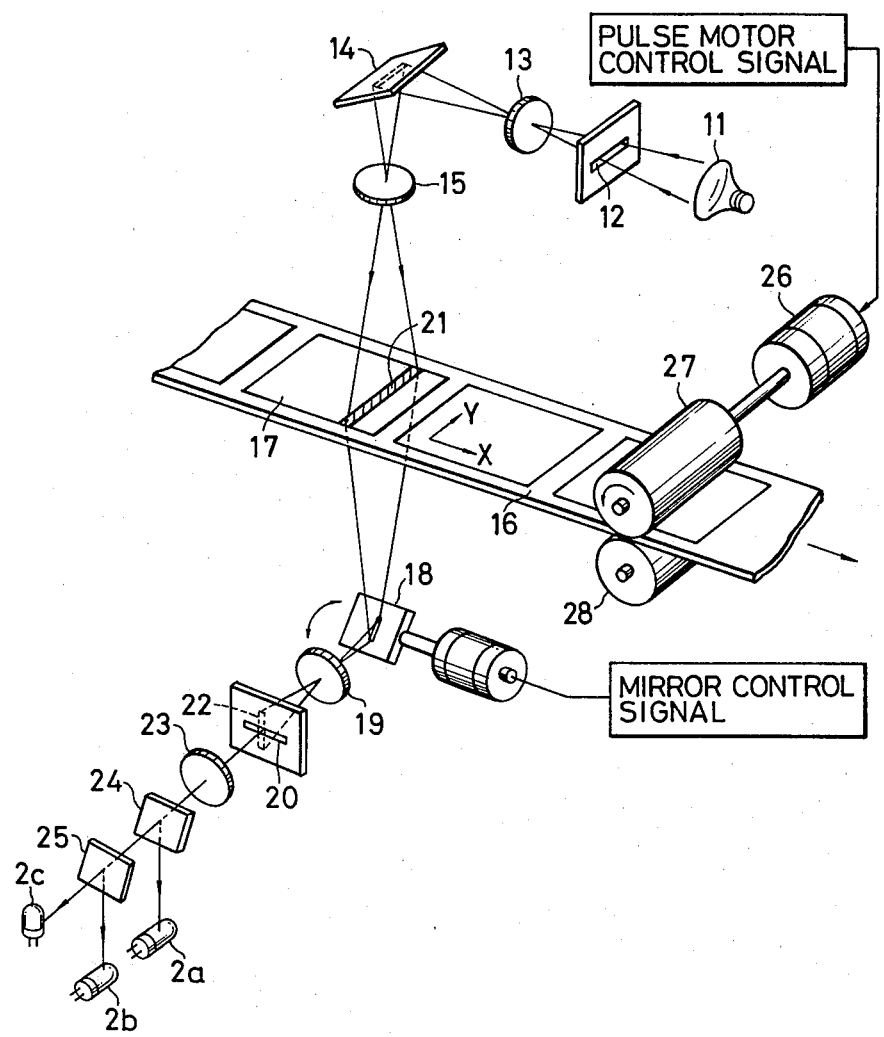
FIG. 4 is a perspective view showing the essential parts of the scanner contained in the system of FIG. 3.

FIG. 4 is a perspective view showing the essential parts of the scanner 1 used in the apparatus of FIG. 3 for measuring the transmission density of a negative film. The illuminating light from a light source 11 passes through an elongated slit 12 and a lens 3 to fall upon a reflective mirror 14. The light is reflected downwardly by the mirror 14 and passes through a lens 15 to reach the image plane 17 of a color photographic film 16. The light illuminates a transverse band 21 of the image plane 17 about 1 mm wide.

The light that has passed through the film 16 is reflected by an underlying scanner mirror 18 and passes through a lens 19 to reach a slit 20. The scanner mirror 18 may be a galvanometer with a mirror, and is swung in response to a sawtooth wave mirror control signal sent from the scanner control circuit 5 shown in FIG. 3.

The light that passes through the band 21 forms an image 22 that crosses the slit 20 at a right angle. If the scanning mirror 18 is swung at a given speed in response to the mirror control signal, the image 22 moves in a vertical direction with respect to the direction of the slit 20 by a distance determined by the swinging range of the mirror.

The light then passes through a lens 23 and is separated into red, blue and green light by dichroic mirrors 24 and 25, and the light enters photo-multipliers 2a, 2b and 2c to measure the amount thereof.

The image plane 17 is scanned in the direction of the y-axis by the scanner mirror 18, and in the direction of the x-axis by advancing the plane 17 by one pitch. Therefore, when the scanner mirror 18 returns to the starting point after completing a scan, the scanner control circuit 5 produces a pulse motor control which rotates a pulse motor 26 by a given angle. Since the pulse motor 26 is connected to a film feed roller 27, the film 16 held between the roller 27 and a back roller 28 is advanced by a given distance. By this procedure, the density information of the respective parts of the image plane 17 is measured.

As described above by reference to a typical embodiment wherein the invention is applied to an exposure determining apparatus for a photographic printer, the method of the present invention is capable of easily and accurately distinguishing an abnormal original from a normal original, and by correcting the print exposure as necessary for the abnormal original, a print having a better color balance than achieved by conventional techniques is obtained.

What is claimed is:

1. A method for locating an abnormal original for photographic print exposure control, comprising subjecting a number of small portions of the original to photometry, determining an average of each of one or more characteristic values determined from the measured values, for frames which are considered to be included in a series of originals, and comparing, using a plurality of said averages, to distinguish an abnormal original from a normal original.

2. The method according to claim 1, wherein said abnormal original is distinguished from said normal original by comparing the average of each characteristic value for the frames which are considered to be included in a series of originals with predetermined values.

3. The method according to claim 1, wherein said abnormal original is distinguished from said normal original by comparing a predetermined value with a value X as calculated by the following decision formula:

$$X = C_0 + C_1\overline{Y}_1 + C_2\overline{Y}_2 + \ldots + C_n\overline{Y}_n$$

wherein:

$C_0, C_1, \ldots C_n$: coefficients, and
$\overline{Y}_1, \overline{Y}_2, \ldots \overline{Y}_n$: the average, for the frames deemed to be included in a series of negatives, of characteristic values $Y_1, Y_2, \ldots Y_n$ determined by photometric measurement of a number of small portions of each original.

4. The method according to claims 1, 2 or 3, wherein at least one of said characteristic values used to detect an abnormal original is selected from among the maximum density (DMX), an area of high-chroma color (CS), an area of neutral color (NS) and the contrast (CNT).

5. The method according to claims 1, 2, or 3, wherein those frames whose characteristic values used to detect an abnormal original are included within a certain range are regarded as being included in a series of originals.

6. The method according to claims 1, 2 or 3, wherein a film roll is divided into halves, and averages of characteristic values are determined individually for said halves.

* * * * *